US012299695B2

(12) United States Patent
Fan et al.

(10) Patent No.: US 12,299,695 B2
(45) Date of Patent: *May 13, 2025

(54) INTERPRETATION WORKFLOWS FOR MACHINE LEARNING-ENABLED EVENT TREE-BASED DIAGNOSTIC AND CUSTOMER PROBLEM RESOLUTION

(71) Applicant: AT&T Intellectual Property I, L.P., Atlanta, GA (US)

(72) Inventors: James Fan, San Ramon, CA (US); Al Hooshiari, Alpharetta, GA (US); Dan Celenti, Holmdel, NJ (US); Eric Forbes, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,584

(22) Filed: Feb. 1, 2024

(65) Prior Publication Data

US 2024/0177173 A1 May 30, 2024

Related U.S. Application Data

(63) Continuation of application No. 17/336,396, filed on Jun. 2, 2021, now Pat. No. 11,893,590.

(51) Int. Cl.
*G06Q 10/00* (2023.01)
*G06N 5/01* (2023.01)
(Continued)

(52) U.S. Cl.
CPC .......... *G06Q 30/016* (2013.01); *G06N 5/01* (2023.01); *G06N 20/00* (2019.01); *G06Q 10/06315* (2013.01); *G06Q 10/0633* (2013.01)

(58) Field of Classification Search
CPC .......... G06Q 30/016; G06Q 10/06315; G06Q 10/0633; G06N 5/01; G06N 20/00
See application file for complete search history.

(56) References Cited

U.S. PATENT DOCUMENTS

2020/0342335 A1* 10/2020 Burke .................... G16H 20/00
2020/0394576 A1* 12/2020 Fan ..................... G06Q 10/0633

OTHER PUBLICATIONS

U.S. Notice of Allowance dated Sep. 6, 2023 in U.S. Appl. No. 17/336,396.

* cited by examiner

*Primary Examiner* — Gabrielle A McCormick
(74) *Attorney, Agent, or Firm* — Hartman & Citrin LLC

(57) ABSTRACT

Concepts and technologies disclosed herein are directed to interpretation workflows for machine learning-enabled event tree-based diagnostic and customer problem resolution. According to one aspect, a system can receive a workflow construction specification derived from a machine learning-enabled event tree ("MLET"). The MLET can be generated for use by a customer service agent to resolve a customer problem. The workflow construction specification can include a plurality of objects, each of which represents a navigation path through the MLET. The system can traverse the workflow construction specification and can create a set of workflow creation commands based upon at least one policy. The system can generate a workflow visualization interpretation file based upon the set of workflow creation commands. The workflow visualization interpretation file can identify how the MLET derived a root cause of the customer problem. The system can then present the workflow visualization interpretation file to the customer service agent.

20 Claims, 9 Drawing Sheets

(51) Int. Cl.
*G06N 20/00* (2019.01)
*G06Q 10/0631* (2023.01)
*G06Q 10/0633* (2023.01)
*G06Q 30/016* (2023.01)

INTERPRETATION WORKFLOWS FOR MACHINE LEARNING-ENABLED EVENT TREE-BASED DIAGNOSTIC AND CUSTOMER PROBLEM RESOLUTION

CROSS-REFERENCE TO RELATED APPLICATIONS

This application is a continuation of and claims priority to U.S. patent application Ser. No. 17/336,396, entitled "Interpretation Workflows for Machine Learning-Enabled Event Tree-Based Diagnostic and Customer Problem Resolution," filed Jun. 2, 2021, now U.S. Pat. No. 11,893,590, which is incorporated herein by reference in its entirety.

BACKGROUND

Service providers use business process management workflow engines to automate customer service problem resolution processes. Traditionally, workflow-based, troubleshooting applications integrate diagnostic functionality with a capability of initiating corrective action. These engines typically provide orchestration and coordination functionality of end-to-end problem resolution processes; however, the performance of these engines is hindered by several shortcomings. In particular, the diagnostic process is based on a linear and sequential implementation of a trial-and-error methodology resulting in an unnecessarily lengthy process responsible for a high percentage of inaccurate solutions and, consequently, many repeat calls (or other contact such as email) from dissatisfied customers because the problem is not solved in a timely manner or not solved at all. In a best case scenario, a sequential, step-by-step problem resolution process can unify the approach of solving common problems by different customer service agents. Often times this process triggers a high number of clarifying requests generated by the business process manager, thus increasing the handling and overall resolution time, with a negative impact on customer experience and operating costs. The business process manager is primarily designed to handle reactive/interactive care. As a result, to address the need of proactive care, most service providers have to rely on a separate diagnostics platform. High operating cost (e.g., due to a high number of initial and repeat calls, dispatches, etc.) can also hinder performance of these engines.

Some companies use an event/fault tree approach to make the workflow solutions more structured. While the typical event/fault trees used to mitigate the above issues also simplify the workflow development process, these event/fault trees are developed solely based upon historical data. This is a rigid approach that leaves no room for real-time adjustments of paths used by customer service agents to traverse the event/fault tree to determine the corrective action(s) to be taken.

Troubleshooting for an identified problem, within a network or service, has always been tedious work. In a normal scenario, there are typically four phases. The first phase is called the contextual data gathering phase. In this phase, symptom and environment data are gathered. In some cases, the trouble area is provided (e.g., customer may identify a problem such as their WI-FI is not working well, etc.). The second phase is called the diagnostic phase. In this phase, assessment or testing tools are used. The results can be fed into an analytic engine to dissect the problem step-by-step and a root cause can be identified. The third phase is called the problem resolution phase. In this phase, a pre-determined workflow can be executed. This workflow provides a step-by-step way to fix the identified root cause. The fourth phase is called the validation and feedback phase. In this phase, it is verified that the problem has been resolved. Feedback then can be provided and recorded. If the problem area cannot be resolved, the workflow will loop back to phase two. The gathered feedback in phase four can be used to enrich the data collected in phase one.

The implementation of phase two can be enhanced by machine learning. However, when machine learning provides a suggested root cause, it is not an easy task for an experienced customer service agent to trust the machine learning result. In order to address the issue of a human trusting the machine learning results, there is a need for a machine learning platform to offer an interpretation workflow that can be used as an interpreter to assist the customer service agent in understanding the logic behind how machine learning reached a particular recommendation. The implementation of phase three is normally done through pre-configured workflows. These workflows are designed and created in a repository. When a root cause is identified, its corresponding workflow can be selected and executed. Unfortunately, no two problems are identical, especially when a customer's profile and their corresponding environment data are also considered. This drawback increases the time needed to reach a resolution. There is a need to dynamically build a personalized workflow to solve different customers' problems even caused by the same root cause.

SUMMARY

Concepts and technologies disclosed herein are directed to aspects of interpretation workflows for machine learning-enabled event tree-based diagnostic and customer problem resolution. According to some aspects of the concepts and technologies disclosed herein, a system can include a processor and a memory. The memory can store computer-executable instructions that, when executed by the processor, cause the processor to perform operations. In particular, the system can receive a workflow construction specification derived from a machine learning-enabled event tree ("MLET"). The MLET can be generated for use by a customer service agent to resolve a customer problem. The customer problem can be associated with a service provided by a service provider to a customer. The customer problem can be associated with a customer device associated with the customer. The customer problem can be associated with a network utilized by the customer. The workflow construction specification can include a plurality of objects, each of which represents a navigation path through the MLET. In some embodiments, the plurality of objects are JavaScript Object Notation ("JSON") or Extensible Markup Language ("XML") objects, although other object types are contemplated. The system can traverse the workflow construction specification and can create a set of workflow creation commands based upon at least one policy. The policy can define how to translate machine learning tasks into workflow tasks. The system can generate a workflow visualization interpretation file based upon the set of workflow creation commands. The workflow visualization interpretation file can identify how the MLET derived a root cause of the customer problem. The system can then present the workflow visualization interpretation file to the customer service agent.

The system can be in communication with an MLET diagnostic subsystem. The MLET diagnostic subsystem can generate the MLET and identify a root cause of the customer problem in a root cause recommendation directed to the system. In addition, the MLET diagnostic subsystem can provide a confidence factor to establish how confident (or not) the MLET diagnostic subsystem is in the root cause recommendation. The MLET diagnostic subsystem can receive a request for an interpretation of the root cause recommendation. In some embodiments, the request is provided by the customer service agent. The MLET diagnostic subsystem can respond to the request by generating the workflow construction specification from the MLET.

The system can find the root cause in a workflow model piece repository. The system can retrieve, from this repository, a set of workflow model pieces that correspond to deriving the root cause. The system can generate a guided problem resolution flow. The system can execute the guided problem resolution flow to guide the customer service agent to resolve the customer problem.

The system can gather feedback data from executing the guided problem resolution workflow and the workflow visualization interpretation file. The system can provide the feedback data to the MLET diagnostic subsystem.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
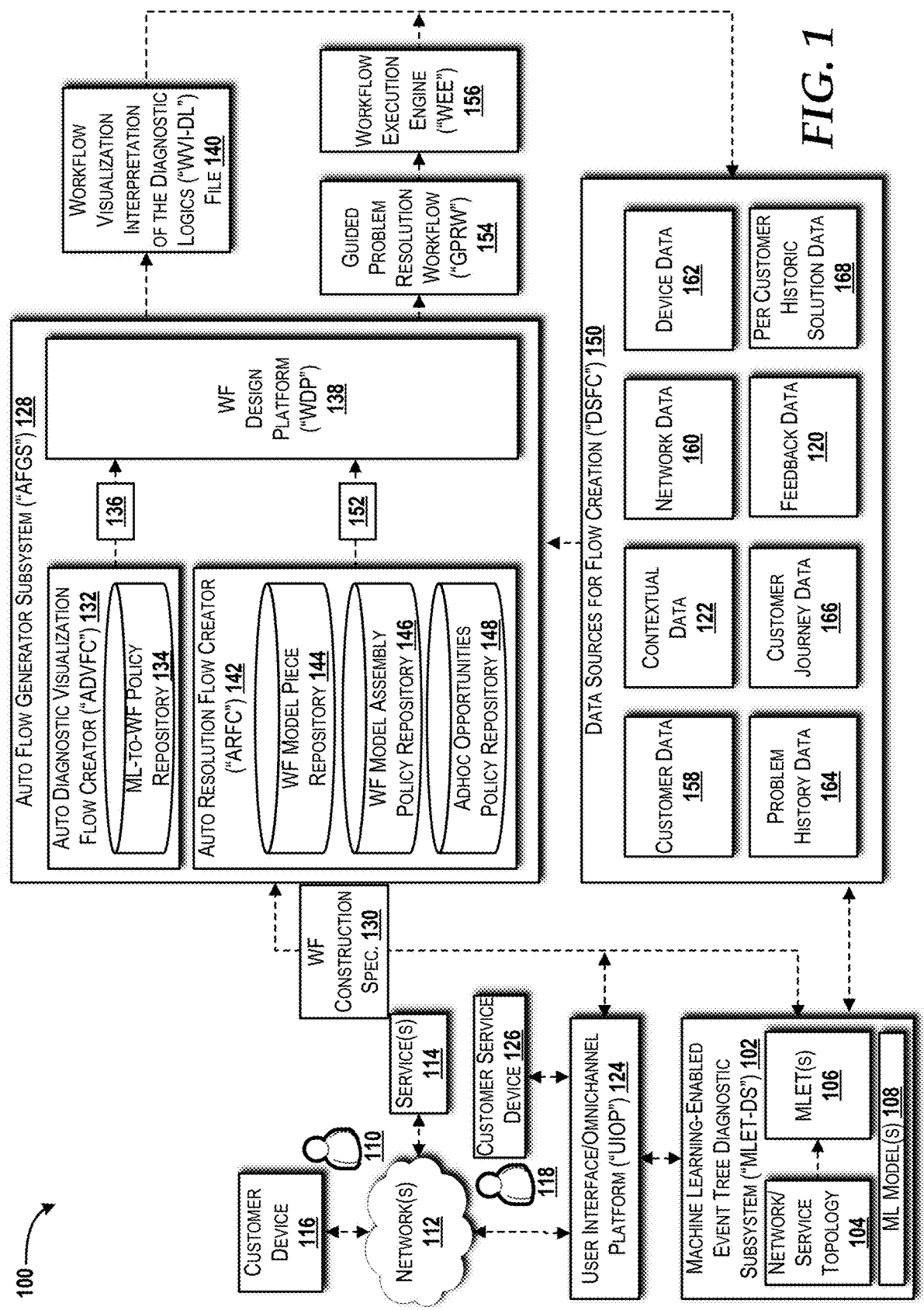
FIG. 1 is a block diagram illustrating aspects of an illustrative operating environment for various concepts and technologies disclosed herein.

As described above, there are four distinct phases during a troubleshooting and problem resolution process. These four phases include a contextual data gathering phase, a diagnostic phase, a problem resolution phase, and validation and feedback phase. The concepts and technologies disclosed herein enhance the diagnostic phase. In a traditional diagnostic engine that incorporates machine learning technology to derive a resolution recommendation, experienced customer service agents and the like may not take seriously a machine learning derived recommendation since the recommendation may deviate from the logics with which the experienced customer service agent is familiar. This mistrust lengthens the time for a machine learning model to be accepted as part of the standard for troubleshooting. To mitigate this issue, the concepts and technologies disclosed herein provide a novel way to reverse engineer the logic behind the recommendation provided by the machine learning model. Additionally, the concepts and technologies disclosed herein convert this reverse engineering recommendation logic into a workflow format with which the customer service agent is familiar. Because the customer service agent now has a way to understand the rationale of the recommendation provided by the machine learning model, they will no longer treat the machine learning model as a black box solution.

The concepts and technologies disclosed herein also address the deficiencies in the problem resolution phase. Instead of using the traditional way to pre-create standard resolution flows per root cause, the disclosed solution uses a library of sub-flows in conjunction with a set of policies that can be adjusted based on machine learning processes learned from a feedback loop to dynamically assemble a personalized resolution workflow tailored on a per customer basis. In addition, a concept referred to as "opportunity policies" is introduced. Opportunity policies enable a workflow builder to insert "advertisement type" sub-flows for upsell and other opportunities. Because the workflows are fully integrated and personalized, overall problem resolution time can be shortened and optimized.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Turning now to FIG. 1, an operating environment 100 in which embodiments of the concepts and technologies disclosed herein will be described. The illustrated operating environment 100 includes a machine learning-enabled event tree diagnostic subsystem ("MLET-DS") 102 that includes a network/service topology 104, one or more MLETs 106 (hereinafter referred to individually as "MLET 106" or collectively as "MLETs 106"), and one or more machine learning models 108 (hereinafter referred to individually as "machine learning model 108" or collectively as "machine learning models 108"). Each of the MLETs 106 is used to model a problem, experienced by one or more customers 110 (hereinafter referred to individually as "customer 110" or collectively as "customers 110"), with one or more networks 112 (hereinafter referred to individually as "network 112" or collectively as "networks 112"), one or more services 114 (hereinafter referred to individually as "service 114" or collectively as "services 114"), and/or one or more customer devices 116, and to enable one or more customer service agents 118 (hereinafter referred to individually as "customer service agent 118" or collectively as "customer service agents 118"), one or more of the customers 110, and/or one or more technicians or other human individuals (not shown) in diagnosing and resolving the problem.

The concept of MLETs 106 was first introduced in U.S. patent application Ser. No. 16/437,074 filed Jun. 11, 2019, entitled "Machine Learning-Enabled Event Tree for Rapid and Accurate Customer Problem Resolution," which is incorporated herein by reference in its entirety. Although aspects of the concepts and technologies disclosed herein are described in particular context of machine learning and MLETs 106, the concepts and technologies disclosed herein should not be construed as being limited to machine learning and MLETs 106. For example, aspects of the concepts and technologies disclosed herein can be used to diagnose and provide a resolution for a problem that occurs within any system, and may find particular applicability to systems that are "black box" in nature.

Leaf nodes in the MLETs 106 represent root causes. Top and intermediate nodes provide a drilldown path through which the customer service agents 118 can navigate to determine a root cause for the problem experienced by the customer 110. In some embodiments, the MLETs 106 can be provided directly to the customers 110. In some other embodiments, the MLETs 106 can be provided to another system, device, other event or process, or some combination thereof.

The MLETs 106 improve the efficiency and accuracy of diagnosing the customer problems by augmenting event tree-based root cause methods with machine learning techniques. Current event tree methods solely rely on historical data to quantify the frequency of certain events and to calculate their probability of occurrence. The integration of machine learning with event trees is accomplished by assigning one or more of the machine learning models 108 to one or more event tree nodes, such as primary decision nodes, including a top event node and one or more intermediate event nodes, as will be described in greater detail below with reference to FIG. 2.

One or more of the machine learning models 108 can be applied to each node in the MLET 106 to add intelligence and to optimize the decision-making process performed by the customer service agents 118 involved in traversing the MLET 106. The machine learning models 108 can be trained based upon historical data associated with resolving the customer problems using, at least in part, a traditional event tree. Moreover, the machine learning models 108 can be re-trained over time based upon feedback data 120 (described in further detail below) that can be provided directly by the customer service agents 118 and/or collected passively based upon outputs disclosed herein. The output of the machine learning models 108 can be augmented with contextual data 122 provided by the customer service agents 118 to improve the accuracy of the predictions made by the customer service agents 118. The contextual data 122 can identify symptoms and environment data. The contextual data 122 can, in some cases, include a problem area provided by the customer 110. For example, the customer 110 may identify a problem such as their WI-FI is not working normally. It should be understood that the breadth of potentials problems that the customer 110 might experience cannot be fully established herein. Accordingly, the example problems mentioned herein should not be construed as being limiting in any way.

Figure 9:
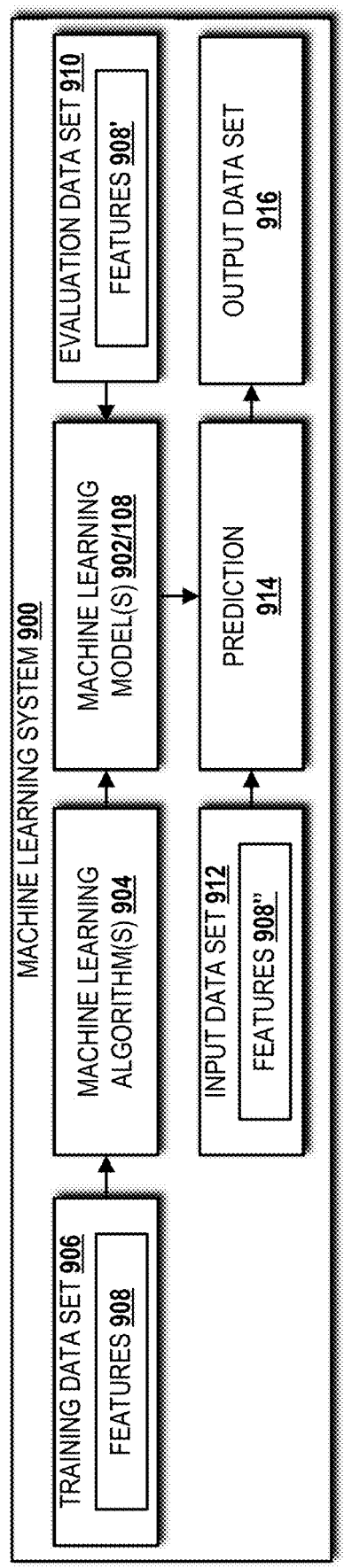
FIG. 9 is a block diagram illustrating a machine learning system capable of implementing aspects of the concept and technologies disclosed herein.

The machine learning models 108 can be created by a machine learning system (best shown in FIG. 9) based upon one or more machine learning algorithms (also best shown in FIG. 9). The machine learning algorithms may be any existing algorithms, any proprietary algorithms, or any future machine learning algorithms. Some example machine learning algorithms include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of other machine learning algorithms not explicitly mentioned herein.

Figure 2:
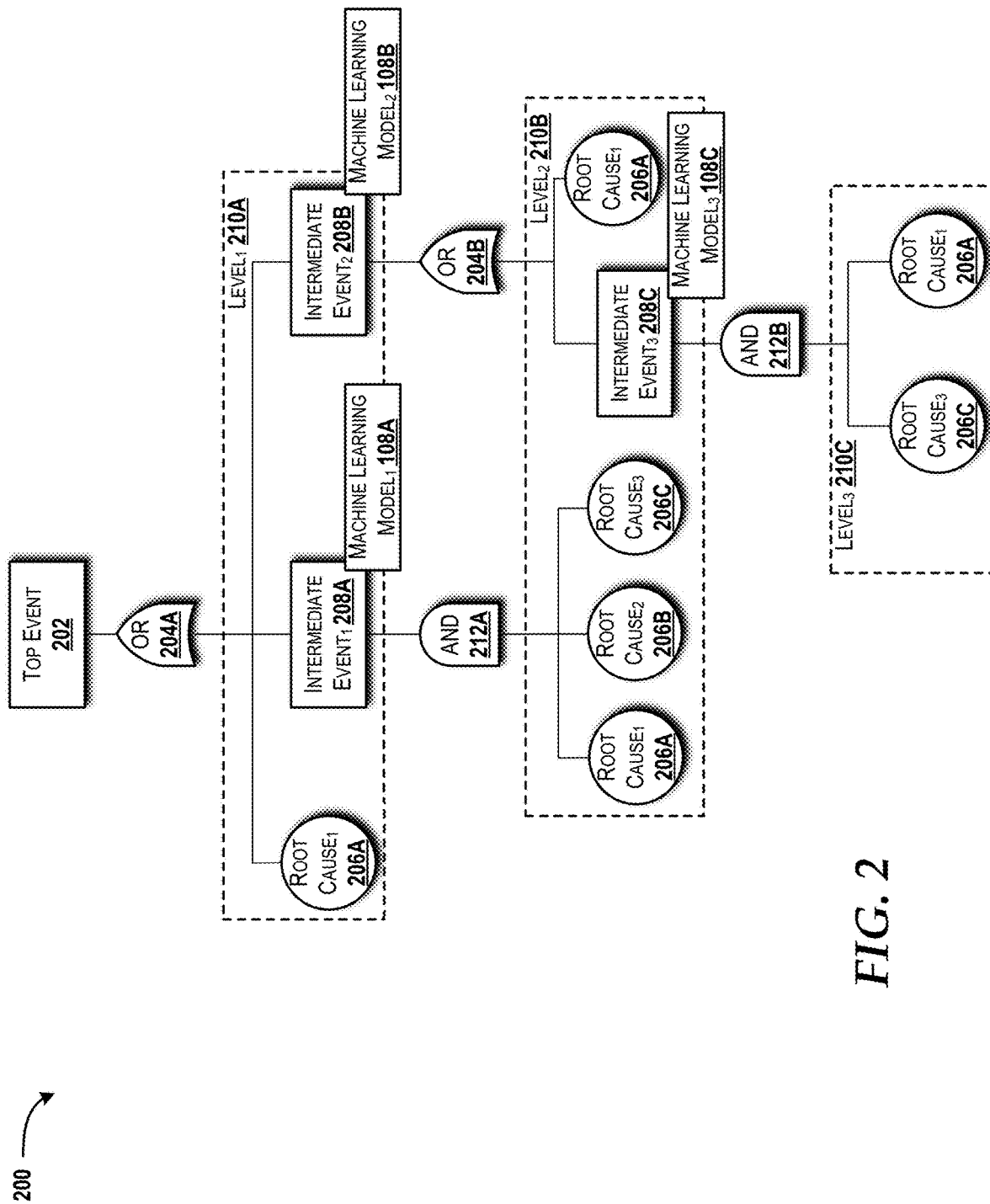
FIG. 2 is a diagram illustrating aspects of an example logical structure and topology for an example machine learning-enabled event tree ("MLET"), according to an illustrative embodiment of the concepts and technologies disclosed herein.

Turning briefly to FIG. 2, an example logical structure and topology 200 for an example MLET 106 will be described, according to an illustrative embodiment. The example MLET 106 can be created to address a particular customer problem or group of customer problems experienced by one or more of the customers 110. The logical structure and topology 200 includes a top event 202 that is representative of a reason why the customer 110 made an inquiry to the customer service agent 118. The top event 202 can identify explicitly the customer problem. In the illustrated example, the top event 202 passes through an OR gate 204A to either a first root cause ("root cause$_1$") 206A, a first intermediate event ("intermediate event$_1$") 208A, or a second intermediate event ("intermediate event$_2$") 208B in a first level ("level$_1$") 210A of the MLET 106. An analysis of the MLET 106 at the level$_1$ 210A indicates that the root cause$_1$ 206A is the most probable cause of the customer problem. The customer service agent 118 could end their analysis at the level$_1$ 210A, or optionally, further analyze the intermediate events 208, which are representative of specific symptoms of the customer problem.

The intermediate events 208 can be analyzed further to uncover the root cause 206 of the top event 202. In the illustrated example, the intermediate event$_1$ 208A passes through an AND gate 212A to the root cause$_1$ 206A, a root cause$_2$ 206B, and a root cause$_3$ 206C in a second level ("level$_2$") 210B of the MLET 106. The intermediate event$_2$ 208B passes through an OR gate 204B to a third intermediate event ("intermediate cvent$_3$") 208C and the root cause 206A in the level$_2$ 210B. An analysis of the MLET 106 at the level$_2$ 210B indicates again that the root cause$_1$ 206A is the most probable cause of the customer problem. The customer service agent 118 could end their analysis at the level$_2$ 210B, or optionally, further analyze the intermediate event$_3$ 208C. In the illustrated example, the intermediate event$_3$ 208C passes through an AND gate 212B to the root cause 206A and the root cause$_3$ 206C in a third level ("level$_3$") 210C of the MLET 106. An overall analysis of the MLET 106 reveals the root cause$_1$ 206A to be the most likely cause of the customer problem. The other root causes 206B, 206C may have contributed, at least in part, the customer problem, but determining one or more corrective actions to address the root cause 206A as the root cause of the customer problem is most likely to yield a successful resolution.

The machine learning model(s) 108 can be applied at specific nodes in the MLET 106. In the illustrated example, a first machine learning model ("machine learning model$_1$") 108A can be applied to the intermediate event$_1$ 208A and a second machine learning model ("machine learning model$_2$") 108B can be applied to the intermediate event$_2$ 208B in the level$_1$ 210A. For the intermediate event$_1$ 208A, the machine learning model$_1$ 108A can be implemented at the discretion of the customer service agent 118 to predict the root cause$_{1-3}$ 206A-206C. For the intermediate event$_2$ 208B, the machine learning model$_2$ 108B can be implemented at the discretion of the customer service agent 118 to predict either the intermediate event$_3$ 208C or the root cause$_1$ 206A. For the intermediate events 208C, the machine learning model$_2$ 108C can be implemented at the discretion of the customer service agent 118 to predict the root cause$_1$ 206A. By relying, at their discretion, on the machine learning models$_{1-3}$ 108A-108C instead of manual analysis, the MLET 106 can be traversed more efficiently to reach the root cause of the customer problem faster and with greater accuracy. In this manner, repeat calls, messages, or other contact from the customer 110 can be mitigated or eliminated with respect to this instance of the customer problem.

In some instances, the customer service agent 118 may have experiences such that they do not readily adopt the recommendations provided by machine learning technologies. This may be the case because machine learning technology is typically implemented as a black box solution and the recommendations provided may deviate from the logic with which the customer service agent 118 is familiar. This mistrust can delay the adoptance of machine learning technologies as part of the standard for customer problem troubleshooting. To mitigate this issue, the concepts and technologies disclosed herein provide a novel way to reverse engineer the logic behind the recommendation provided by the machine learning model(s) 108. Additionally, the concepts and technologies disclosed herein convert this reverse engineering recommendation logic into a workflow format with which the customer service agent 118 is familiar. Because the customer service agent 118 now has a way to understand the rationale of the recommendation provided by the machine learning model(s) 108, they will no longer treat the machine learning technology as a black box solution and will be more amenable to accepting the recommendation.

Returning to FIG. 1, the customers 110 may be human customers that utilize the service(s) 114, the networks 112, and/or the customer device(s) 116. During use of the service(s) 114, the network(s) 112, and/or the customer device(s) 116, the customers 110 may experience one or more problems that prompt the customers 110 to contact the customer service agents 118 for a resolution. The customer problems can include any problems the customers 110 have with the service(s) 114, the network(s) 112, and/or the customer device(s) 116. The customer problems can generally include customer experience problems, service availability problems, service degradation problems, service performance problems, customer device software problems, customer device firmware problems, customer device hardware problems, customer device performance problems, combinations thereof, and the like. The resolution provided by the customer service agent 118 can include one or more corrective actions. A corrective action can generally include any action taken by the customer service agents 118, or taken by the customers 110 at the direction of the customer service agents 118, to resolve, at least in part, the customer problem. It should be understood that the specific details of a given customer problem can vary widely depending upon multiple factors, and as such, it is impossible to disclose every possible combination of factors that results in a given customer problem. Likewise the specific details of a given corrective action can vary widely depending upon the specific details of a given customer problem. For this reason, the specific examples of the customer problems disclosed herein are merely exemplary of some customer problems that the corrective action(s) can be used to resolve, and as such, should not be construed as being limiting in any way.

The customer service agents 118 may be human agents that work with the customers 110 to troubleshoot and resolve the customer problems. The customer service agents 118 may be associated with one or more entities (e.g., company, enterprise, non-profit organization, charity organization, government entity, public/private school, childcare facility, University/college, and/or the like) that provide the service(s) 114, the network(s) 112, and/or the customer device(s) 116. The customer service agents 118 may be employees of one or more of the entities, contractors for one or more of the entities, or volunteers for one or more of the entities.

The services 114 may be any service used by the customer(s) 110, including both paid and free services. By way of example, and not limitation, the service(s) 114 can include telecommunications services, Internet services, television services, utility services, information technology services, professional services, medical services, financial services, combinations thereof, and the like. Those skilled in the art will appreciate the applicability of the concepts and technologies disclosed herein to any type of service. Accordingly, any example services described herein should not be construed as limiting in any way.

The networks 112 may be or may include any wired, wireless, or hybrid network utilizing any existing or future network technology. The networks 112 can be or can include telecommunications networks, the Internet, other packet data networks, any other network disclosed herein, combinations thereof, and the like. The networks 112 can include private networks and/or public networks. The networks 112 can include local area networks ("LANs"), wide area networks ("WANs"), personal area networks ("PANs"), metropolitan area networks ("MANs"), other area networks, combinations thereof, and the like. In some embodiments, the networks 112 include one or more mobile telecommunications networks that utilize any wireless communications technology or combination of wireless communications technologies such as, but not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. Embodied as a mobile telecommunications network, the networks 112 can support various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data described herein can be exchanged over the mobile telecommunications network via cellular data technologies such as, but not limited to, General Packet Radio Service ("GPRS"), Enhanced Data rates for Global Evolution ("EDGE"), the High-Speed Packet Access ("HSPA")

protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. The mobile telecommunications network can be improved or otherwise evolve to accommodate changes in industry standards, such as to adhere to generational shifts in mobile telecommunications technologies, such as is colloquially known as 4G, 5G, etc. As such, the example technologies described herein should not be construed as limiting in any way. Additional details of an example network 112 will be described herein with reference to FIG. 7.

The customer devices 116 can communicate, via the network(s) 112, with each other, the service(s) 114, other devices, other systems, other networks, combinations thereof, and the like. In the illustrated example, the customer devices 116 can enable the customers 110 to communicate with the customer service agent 118 via a user interface/ omnichannel platform ("UIOP") 124 that provides a centralized interface through which the customers 110 can contact a service provider (e.g., a service provider of the network(s) 112 and/or the service(s) 114) for assistance with customer problems. The UIOP 124 enables connectivity between the customer devices 116 and one or more customer service devices 126 (hereinafter referred to individually as "customer service device 126" or collectively as "customer service devices 126") through which the customer service agents 118 can assist the customers 110.

The functionality of the customer devices 116 can be provided by one or more mobile telephones, smartphones, tablet computers, slate computers, smart watches, fitness devices, smart glasses, other wearable devices, mobile media playback devices, set top devices, router devices, switch devices, gateway devices (e.g., residential gateway devices), navigation devices, laptop computers, notebook computers, ultrabook computers, netbook computers, server computers, computers of other form factors, computing devices of other form factors, other computing systems, other computing devices, Internet of Things ("IoT") devices, other unmanaged devices, other managed devices, and/or the like. It should be understood that the functionality of the customer devices 116 can be provided by a single device, by two or more similar devices, and/or by two or more dissimilar devices.

Similarly, the functionality of the customer service devices 126 can be provided by one or more mobile telephones, smartphones, tablet computers, slate computers, laptop computers, notebook computers, ultrabook computers, netbook computers, server computers, computers of other form factors, computing devices of other form factors, other computing systems, other computing devices, and/or the like. It should be understood that the functionality of the customer service devices 126 can be provided by a single device, by two or more similar devices, and/or by two or more dissimilar devices.

The customer service agents 118 have full control of the way in which various levels of machine learning are used. Navigation controllers may be added to one or more nodes in the MLETs 106 to allow the customer service agents 118 to decide, based on their experience and latency requirements, how much their prediction should rely on the machine learning models 108. In some embodiments, the customer service agents 118 can use a navigation controller at a top event node (e.g., the top event 202 in FIG. 2) to select a monolithic machine learning model of the machine learning models 108 to replace the entirety of the MLET 106 under consideration. In other embodiments, the customer service agent 118 can use a navigation controller at the top event node to select one or more of the machine learning models 108 to partially traverse the MLETs 106 and skip some steps via manual intervention by the customer service agent 118. In other embodiments, the machine learning model 108 can be used to navigate through each node while the customer service agent 118 is traversing the MLET 106. In this manner, navigation controllers can provide an innovative control feature to one or more nodes in the MLET 106 that allows the customer service agents 118 to decide how the MLETs 106 should be traversed (e.g., level-by-level, sequentially, or by skipping some or all levels of the MLET 106) and to monitor and visualize the transactions. Navigation controllers allow the customer service agents 118 to dynamically enable, disable, and adjust the level of machine learning involvement at each level of the MLETs 106. The customer service agents 118 are in full control of choosing a diagnostic path. As a result, the same problem experienced by different customers 110, or by the same customer 110 at a different time, may be diagnosed by traversing the MLET 106 following different paths. The outcome of the diagnostic process (i.e., the recommendation of one or more corrective actions) can be recorded along with the decision steps leading to the outcome and the associated contextual data.

Each navigation path assisted by machine learning can be logged in a JavaScript Object Notation ("JSON") or Extensible Markup Language ("XML") object. Other object types are contemplated, and as such, the use of JSON and/or XML objects herein should not be construed as being limiting in any way. The MLET-DS 102 can deliver the object(s) to an auto flow generator subsystem ("AFGS") 128 as part of a workflow construction specification 130. The workflow construction specification 130 can be received from a human such as the customer service agent 118 or the customer 110. Alternatively, the request may be generated automatically via built-in logic in the MLET 106. The AFGS 128 can receive the workflow construction specification 130 and determine the logics used by the machine learning model(s) 108 to build a visualization workflow and/or a resolution workflow. In this manner, the AFGS 128 can transform the recommendation made by the MLET 106 into a format suitable for the customer service agent 118 to understand the decision logics made by the machine learning models 108 so that machine learning technology is no longer viewed as a black box solution.

The AFGS 128 includes an auto diagnostic visualization flow creator ("ADVFC") 132 that receives the workflow construction specification 130 that includes JSON/XML objects that define a decoded path through the MLET 106. This path includes key data attributed from the top node to a root cause. In addition, the JSON/XML objects include metadata depicting the MLET 106 traversal logics. The ADVFC 132 can use one or more policies from a machine learning-to-workflow policies repository 134 to create a series of workflow creation commands 136. These policies can define how to translate machine learning tasks into workflow tasks. The workflow creation commands 136 can be sent to a workflow design platform ("WDP") 138 as the input for workflow generation. The WDP 138 can be a proprietarily built workflow creation engine, a vendor provided workflow creation engine, or an open source workflow creation engine. The WDP 138 receives the workflow creation commands 136 from the ADVFC 132 and uses the creation engine to convert the workflow creation commands 136 into a standard workflow represented as a workflow visualization interpretation of the diagnostic logics ("WVI-DL") file 140.

The AFGS 128 also includes an auto resolution flow creator ("ARFC") 142. The ARFC 142 also receives, in the workflow construction specification 130, a root cause identified in the MLET 106. The ARFC 142 uses the root cause code to search a workflow model piece repository 144 to identify all needed workflow components. The ARFC 142 then uses a workflow model assembly policy repository 146 to retrieve metadata from one or more data sources for flow creation ("DSFC") 150. The ARFC 142 then creates an integrated flow command set 152 and provides the integrated flow command set 152 to the WDP 138 as the input for generating a guided problem resolution workflow ("GPRW") 154. The dynamic workflow generation is adaptive and powerful. Even for the same customer reporting the same problem at a different time, the generated workflow may be different depending on metadata collected and correlated at the time. The ARFC 142 can add adhoc sub-flows for upsell opportunities, based upon one or more policies in an adhoc opportunities policy repository 148, that the customer service agent 118 may be able to use as part of the resolution process.

There are two outputs of the AFGS 128. One output is the WVI-DL file 140. This output is a translation workflow that translates how the MLET 106 derives a root cause of the reported problem. Although this translation flow is for visualization purposes, it can allow the customer service agent 118 to traverse the workflow as if it were a real executable workflow. In practice, an interactive item (e.g., mouse click) that may have an effect may be a root cause or similar icon that allows the ARFC 142 to be executed. When the root cause icon is clicked or otherwise selected, the ARFC 142 can generate a second output, which is the GPRW 154. This output can be an auto-generated personalized resolution workflow to assist the customer service agent 118 in resolving the reported problem for the customer 110. The GPRW 154 can be validated and sent to a workflow execution engine ("WEE") 156. The WEE 156 can receive and execute the GPRW 154. The WEE 156 can be a proprietary, vendor provided, or open source workflow execution engine.

The DSFC 150 includes data source repositories containing data used to support the AFGS 128 and the MLET-DS 102. The illustrated DSFC 150 includes data repositories that contain, but are not limited to containing, customer data 158, contextual data 122, network data 160, device data 162, problem history data 164, customer journey data 166, feedback data 120, and per customer historic solution data 168.

The customer data 158 can include any information shared by the customer 110 with the customer service agent 118 or otherwise available to the customer service agent 118 due to the customer 110 having an account or other association with the network(s) 112, the service(s) 114, and/or the customer device 116.

The contextual data 122 can help identify the problem the customer 110 is having. For example, the contextual data 122 can include information about the symptoms of the problem and/or environment data about the environment in which the customer 110 is experiencing the problem.

The network data 160 can include data about the network(s) 112. The network data 160 can additionally include data about how the customer 110 interacts with the network(s) 112, such as via the customer device 116, to access the service(s) 114.

The device data 162 can include any data about the customer device 116. For example, the device data 162 can include device type, manufacturer, operating system, firmware, software, hardware components, and/or the like about the customer device 116.

The problem history data 164 can include any information about one or more problems that have occurred in association with the network(s) 112, the service(s) 114, and/or the customer device 116. The problem history data 164 can include problem history from the customers 110 alone or combined with problem history from other sources (e.g., development systems utilized by the network(s) 112 and/or the service(s) 114).

The customer journey data 166 can include a detailed account of the customer 110 and their interaction with the network(s) 112, the service(s) 114, and/or the customer device 116. The customer journey data 166 can include important dates such as when the customer 110 became a customer, any changes to the customer device 116 (e.g., device upgrade), any changes to the services(s) 114 (e.g., from pre-paid to post-paid subscription), and the like. The customer journey data 166 can also identify any problems the customer 110 may have experienced in the past.

The feedback data 120 can include the WVI-DL file 140 generated by the AFGS 128. The feedback data 120 also can include results of the GPRW 154 executed by the WEE 156.

The per customer historic solution data 168 can include historic solutions to customer problems on a per customer basis. For example, a solution to a problem the customer 110 has experienced in the past can be stored as part of the per customer historic solution data 168. The GPRW 154 can leverage the contextual data 122 and per customer historic solution data 168 to improve handling time and building customer relationships. The per customer historic solution data 168 can include not only a record of the historic solution but also the workflow metadata (e.g., flow identification, flow results, adhoc benefits, etc.). This information can make future personalized recurrences to run much smoother. Another added benefit is to be input to collaborative filtering algorithm to assist customers in the related class. The per customer historic solution data 168 can be used in two ways. The information can be used to retrain the machine learning models 108 in the MLET-DS 102. After the training, any navigation logic to traverse the MLET(s) 106 can be fine-tuned. The per customer historic solution data 168 can also be used to help generate solution flows. This dataset can cause a personalized resolution to be generated which deviates from the resolution generated for a similar root cause of another customer who happens to report a similar problem.

Figure 3:
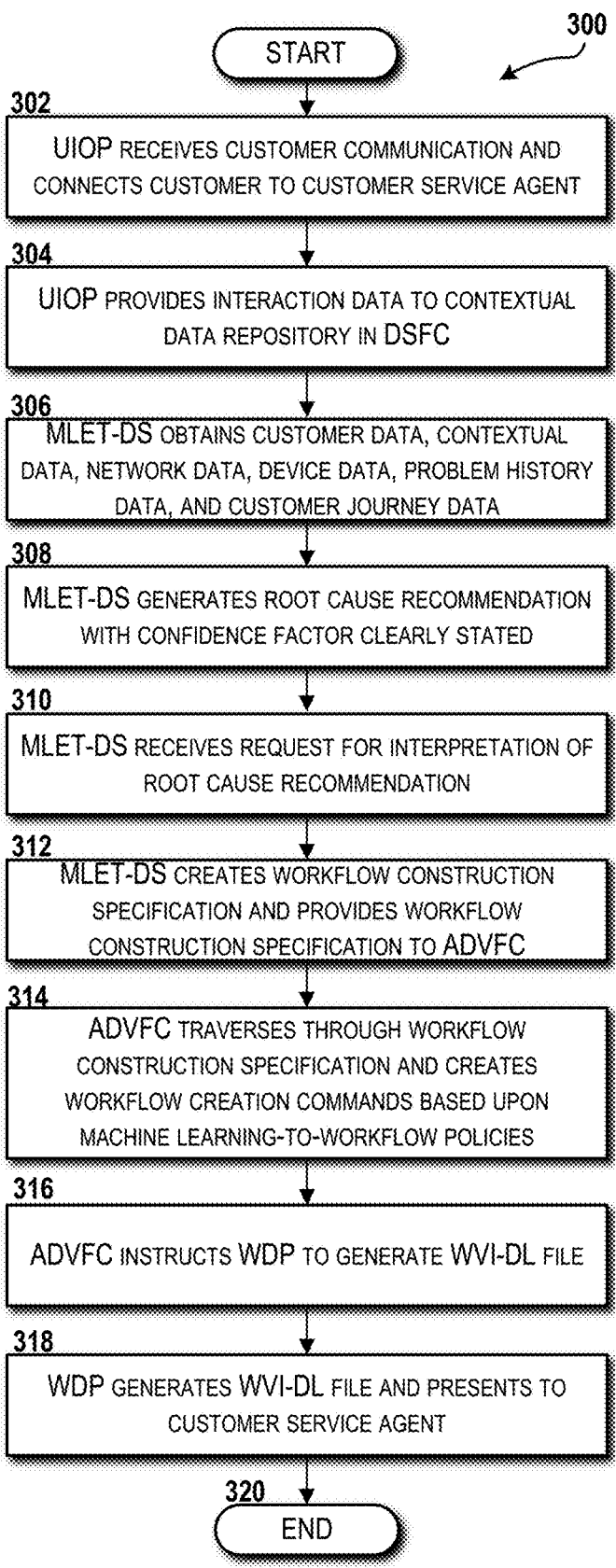
FIG. 3 is a flow diagram illustrating aspects of a method for generating a workflow visualization interpretation of the diagnostics logics ("WVI-DL"), according to an illustrative embodiment of the concepts and technologies disclosed herein.

Turning now to FIG. 3, a flow diagram illustrating aspects of a method 300 for generating the WVI-DL file 140 will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302. At operation 302, the UIOP 124 receives a customer communication and connects the customer 110 to one of the customer service agents 118. The customer communication can be, but is not limited to, a telephone call, a chat dialogue, an email, a proprietary messaging system, or the like. From operation 302, the method 300 proceeds to operation 304. At operation 304, the UIOP 124 provides interaction data associated with the customer communication to the contextual data 122 repository in the DSFC 150. In this manner, the UIOP 124 can keep the DSFC 150 up-to-date with the latest information about the customer 110 and their interactions with the customer service agents 118.

From operation 304, the method 300 proceeds to operation 306. At operation 306, the MLET-DS 102 obtains data from the DSFC 150. This data can include the customer data 158, the contextual data 122, the network data 160, the device data 162, the problem history data 164, the customer journey data 166, the feedback data 120, the per customer historic solution data 168, or some combination thereof. From operation 306, the method 300 proceeds to operation 308. At operation 308, the MLET-DS 102 generates a root cause recommendation with a confidence factor clearly stated. The customer service agent 118 can access the root cause recommendation and consider whether to accept the root cause recommendation based upon their knowledge of the customer problem and the confidence factor. The remaining operations assume the customer service agent 118 would like a better understanding of how the root cause recommendation was reached prior to proceeding further.

From operation 308, the method 300 proceeds to operation 310. At operation 310, the MLET-DS 102 receives a request, from the customer service agent 118, for an interpretation of the root cause generated by one or more of the machine learning models 108. From operation 310, the method 300 proceeds to operation 312. At operation 312, the MLET-DS 102 creates the workflow construction specification 130 and provides the workflow construction specification 130 to the ADVFC 132.

From operation 312, the method 300 proceeds to operation 314. At operation 314, the ADVFC 132 traverses through the workflow construction specification 130 and creates the workflow creation commands 136 using one or more machine learning-to-workflow policies from the machine learning-to-workflow policy repository 134. From operation 314, the method 300 proceeds to operation 316.

At operation 316, the ADVFC 132 instructs the WDP 138 to generate the WVI-DL file 140 based upon the workflow creation commands 136. In some embodiments, the ADVFC 132 can invoke one or more application programming interface ("API") calls to the WDP 138 to request generation of the WVI-DL file 140. From operation 316, the method 300 proceeds to operation 318. At operation 318, the WDP 138 generates the WVI-DL file 140 and presents the WVI-DL file 140 to the customer service agent 118, such as via a display of the customer service device 126. The customer service agent 118 can use the WVI-DL file 140 to visualize and better understand how the MLET-DS 102 developed the root cause recommendation. The WVI-DL file 140 can include an icon or other interactive element that the customer service agent 118 can click or otherwise select to view the root cause.

From operation 318, the method 300 proceeds to operation 320. The method 300 can end at operation 320.

Figure 4:
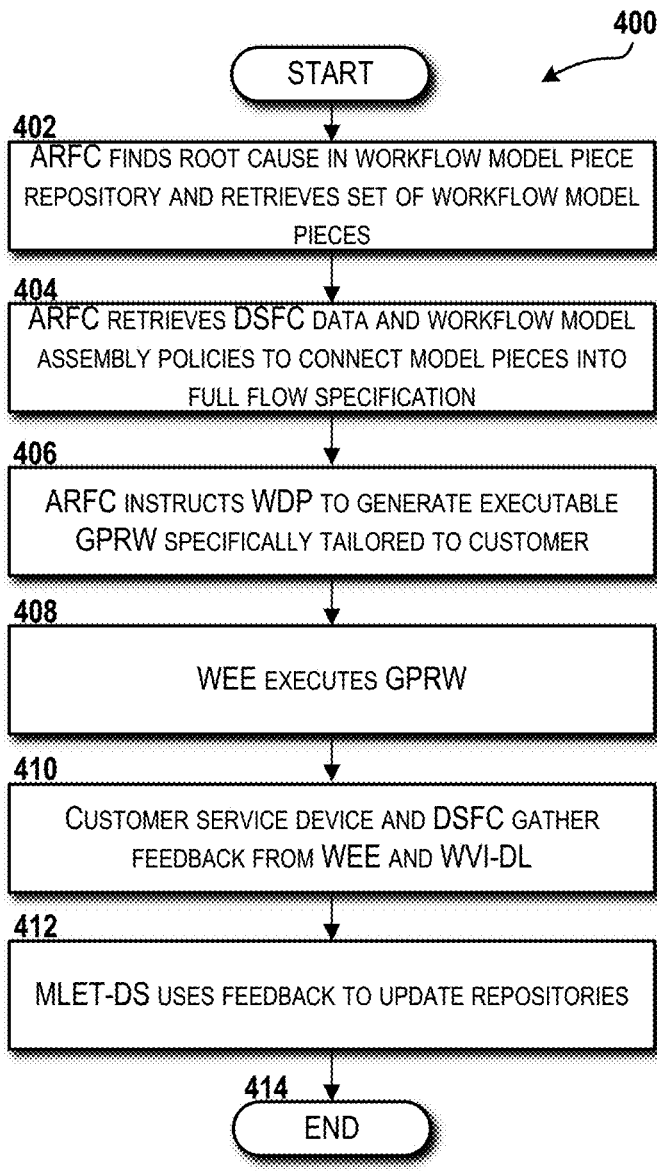
FIG. 4 is a flow diagram illustrating aspects of a method for generating a guided problem resolution workflow ("GPRW"), according to an illustrative embodiment of the concepts and technologies disclosed herein.

Turning now to FIG. 4, a method 400 for generating the GPRW 154 will be described, according to an illustrative embodiment of the concepts and technologies disclosed herein. The method 400 begins after execution of the method 300 and upon the customer service agent 118 clicking or otherwise selecting the root cause icon presented in the WVI-DL file 140. This indicates that the customer service agent 118 has reviewed the WVI-DL file 140 and agrees with the root cause recommendation provided by the MLET-DS 102. If the customer service agent disagrees, they can ignore the recommendation and proceed as desired. The method 400 assumes that the customer service agent 118 agrees with the root cause recommendation.

The method 400 begins and proceeds to operation 402. At operation 402, the ARFC 142 finds the root cause in the workflow model piece repository 144 and retrieves a set of workflow model pieces. From operation 402, the method 400 proceeds to operation 404. At operation 404, the ARFC 142 retrieves data from the DSFC 150 and one or more policies from the workflow model assembly policy repository 146 based upon which the ARFC 142 can connect the model pieces into a full workflow specification. The ARFC 142 may add or remove one or more conditional statements. In some embodiments, the ARFC 142 can add adhoc sub-flows for upsell opportunities that the customer service agent 118 may be able to use as part of the resolution process.

From operation 404, the method 400 proceeds to operation 406. At operation 406, the ARFC 142 instructs the WDP 138 to generate the GPRW 154 that is specifically tailored to the customer 110. In some embodiments, the ARFC 142 can invoke one or more API calls to direct the WDP 138 to generate the GPRW 154. From operation 406, the method 400 proceeds to operation 408. At operation 408, the WEE 156 executes the GPRW 154.

From operation 408, the method 400 proceeds to operation 410. At operation 410, the customer service device 126 and the DSFC 150 gather the feedback data 120 from the WEE 156 and the WVI-DL file 140. From operation 410, the method 400 proceeds to operation 412. At operation 412, the MLET-DS 102 uses the feedback data 120 to update the repositories 134, 144, 146, 148.

From operation 412, the method 400 proceeds to operation 414. The method 400 can end at operation 414.

Figure 5:
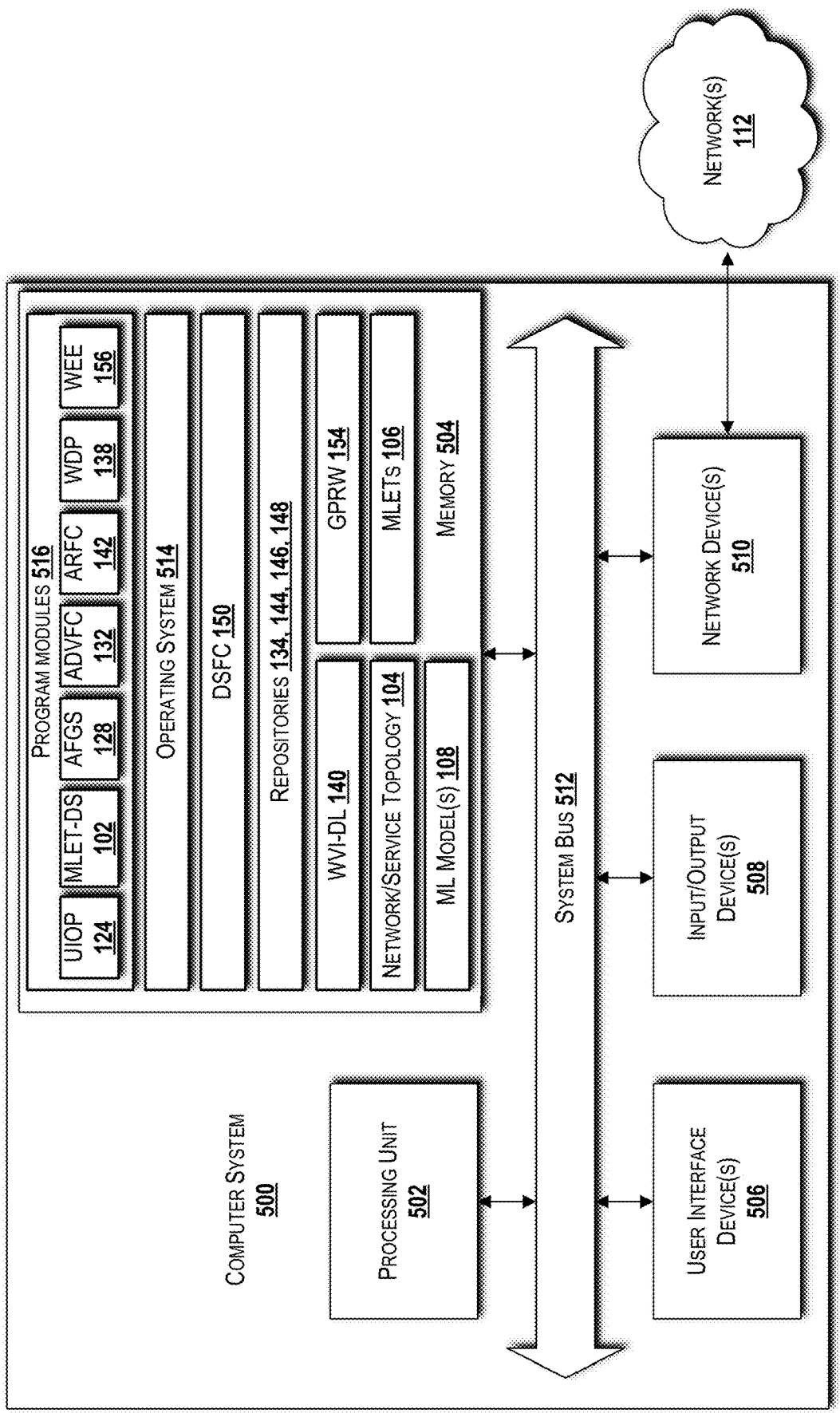
FIG. 5 is a block diagram illustrating an example computer system, according to some illustrative embodiments.

Turning now to FIG. 5, a block diagram illustrating a computer system 500 configured to provide the functionality described herein in accordance with various embodiments of the concepts and technologies disclosed herein will be described. In some embodiments, the customer devices 116, the customer service devices 126, other systems, and/or other devices disclosed herein can be configured like and/or can have an architecture similar or identical to the computer system 500 described herein with respect to FIG. 5. It should be understood, however, any of these systems, devices, or elements may or may not include the functionality described herein with reference to FIG. 5.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the computer system 500.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules described herein, such as the MLET-DS 102, the UIOP 124, the AFGS 128, the ADVFC 132, the ARFC 142, the WDP 138, and the WEE 156. The memory 504 also can store the DSFC 150, the repositories 134, 144, 146, 148, the WVI-DL 140, the GPRW 154, the network/service topology 104, the MLET(s) 106, the machine learning models 108, combinations thereof, and/or other data disclosed herein.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer to output data.

The network devices 510 enable the computer system 500 to communicate with other networks or remote systems via the network(s) 112. Examples of the network devices 510 include, but are not limited to, a modem, an RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such as a WiMAX network, or a cellular network. Alternatively, the network(s) may be a wired network such as, but not limited to, a WAN such as the Internet, a LAN, a wired PAN, or a wired MAN.

Figure 6:
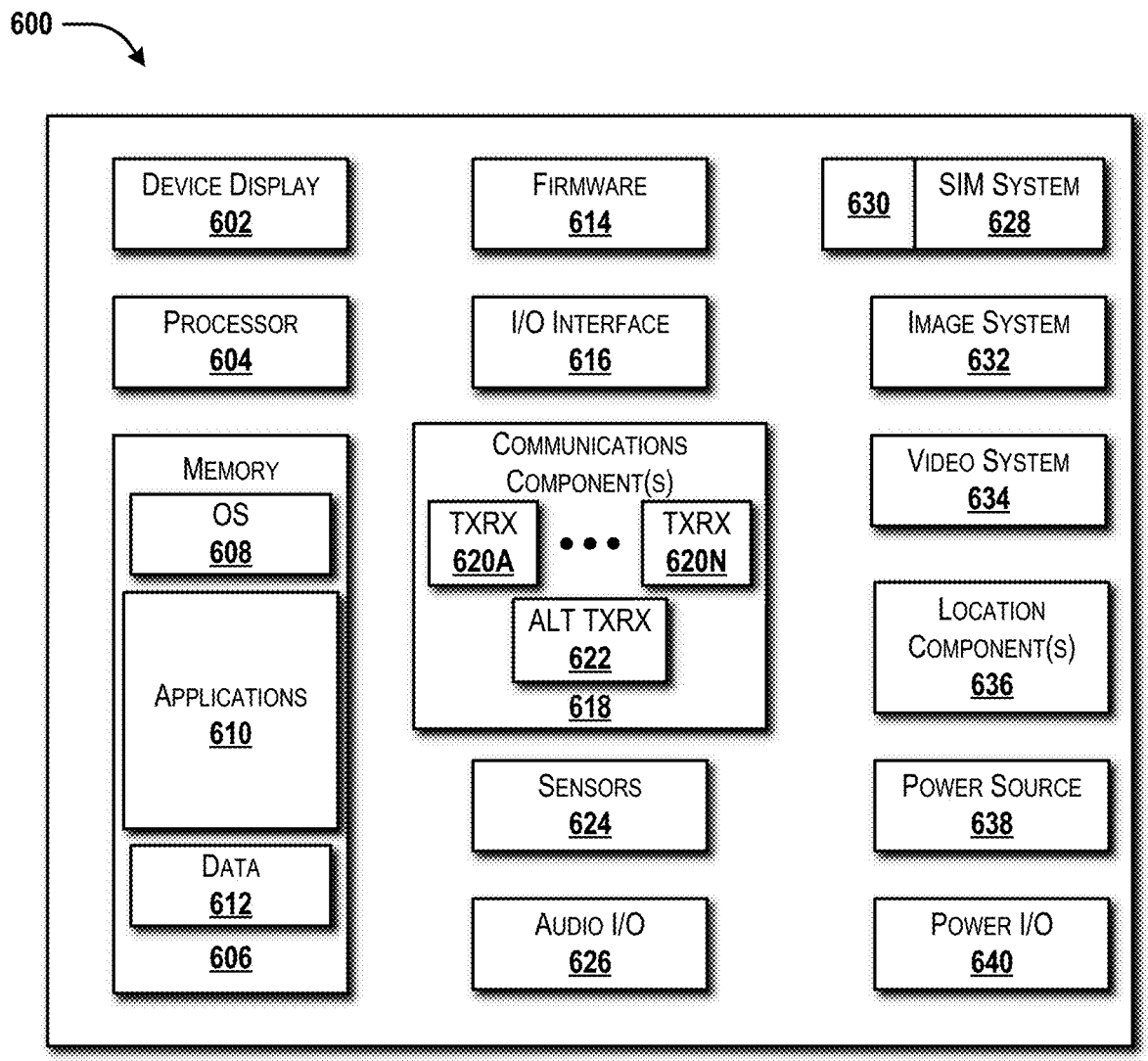
FIG. 6 is a block diagram illustrating an example mobile device, according to some illustrative embodiments.

Turning now to FIG. 6, an illustrative mobile device 600 and components thereof will be described. In some embodiments, the customer devices 116, the customer service devices 126, other systems, and/or other systems disclosed herein can be configured as and/or can have an architecture similar or identical to the mobile device 600 described herein with respect to FIG. 6. It should be understood, however, that the customer devices 116 and/or the customer service devices 126 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a device display 602 for displaying data. According to various embodiments, the device display 602 can be configured to display any information. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in the memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in interacting with data. The UI application can be executed by the processor 604 to aid a user in answering/initiating calls, entering/deleting other data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600.

According to various embodiments, the applications 610 can include, for example, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It should be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks, such as the network 143. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMAONE, CDMA2000, LTE, and various other 2G, 2.5G, 3G, 4G, 5G and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an N$^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. One or more of the sensors 624 can be used to detect movement of the mobile device 600. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, CCDs, combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a specific location of the mobile device 600. According to various embodiments, the location components 636 can send and/or receive signals from GPS devices, A-GPS devices, WI-FI/WIMAX and/or cellular network triangulation data, combinations thereof, and the like. The location component 636 also can be configured to communicate with the communications component 618 to retrieve triangulation data from the network(s) 112 for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
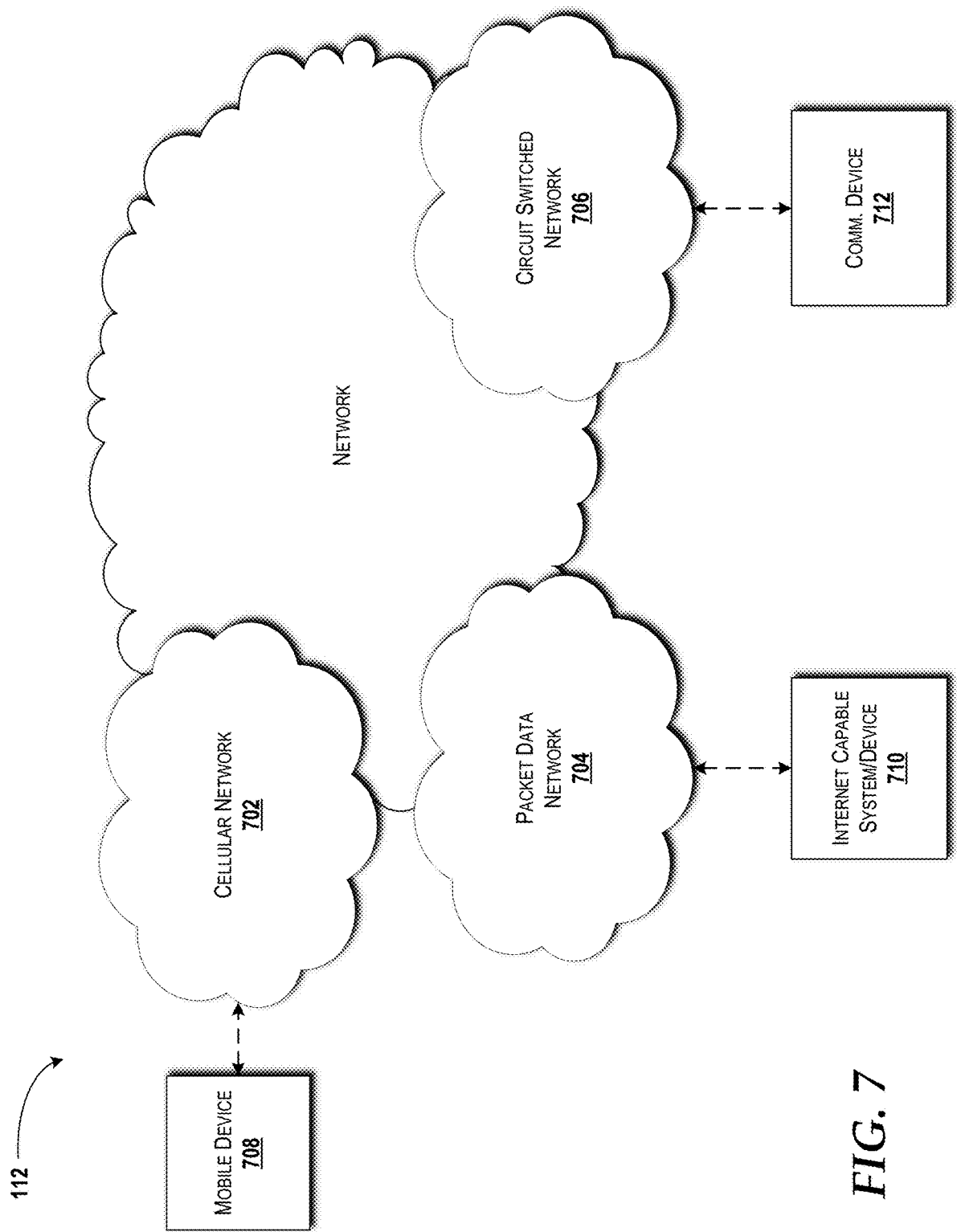
FIG. 7 schematically illustrates a network, according to an illustrative embodiment.

Turning now to FIG. 7, additional details of an embodiment of the network 112 are illustrated, according to an illustrative embodiment. In the illustrated embodiment, the network 112 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the customer device 116, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards as well as evolved and future mobile standards. In some embodiments, the network 112 can be configured like the cellular network 702.

The packet data network 704 can include various systems and devices, for example, the customer devices 116, the customer service devices 126, the UIOP 124, the MLET-DS 102, the AFGS 128, the WEE 156, servers, computers, databases, and other devices in communication with another. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet.

The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable systems/devices 710, for example, the customer devices 116, the customer service devices 126, a personal computer ("PC"), a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, the customer device 116, the customer service device 126, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. It should be appreciated that substantially all of the functionality described with reference to the network 116 can be performed by the cellular network 702, the packet data network 704, and/or the circuit switched network 706, alone or in combination with additional and/or alternative networks, network elements, and the like.

Figure 8:
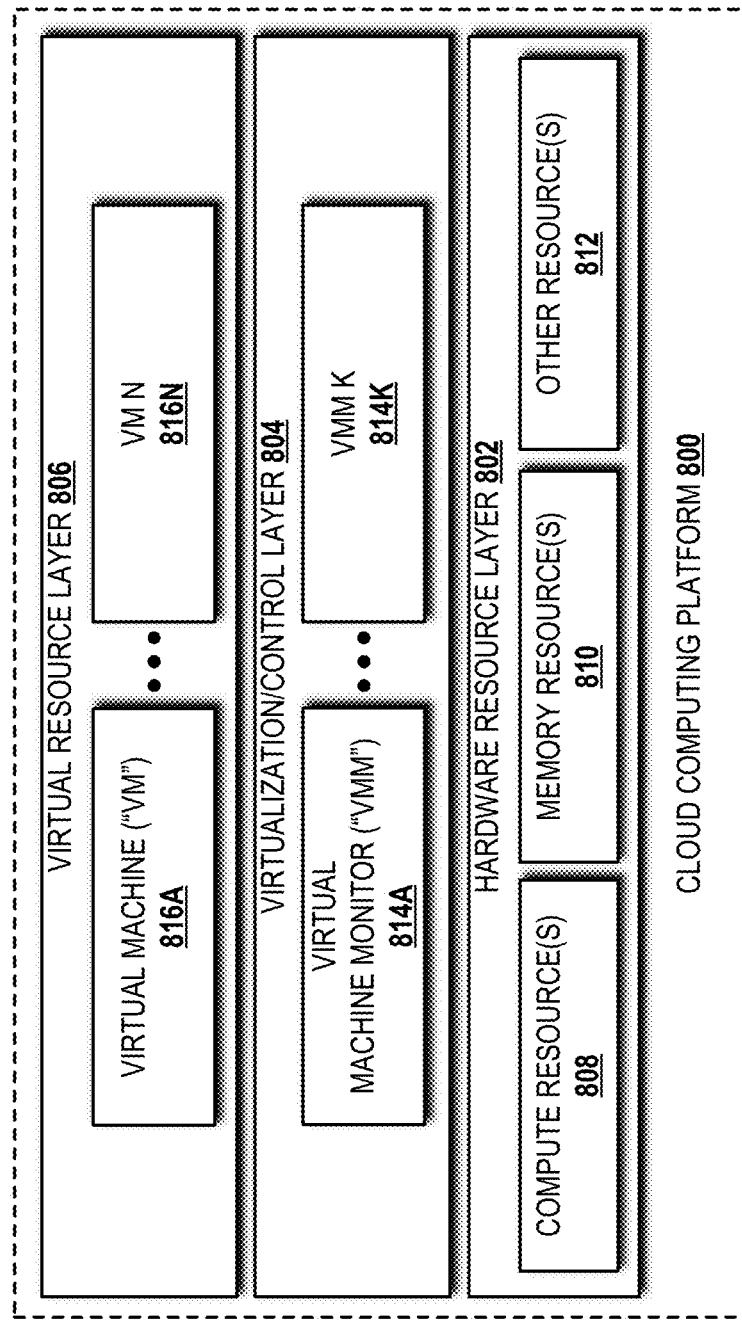
FIG. 8 is a block diagram illustrating a cloud computing platform capable of implementing aspects of the concepts and technologies disclosed herein.

Turning now to FIG. 8, a cloud computing platform 800 capable of implementing aspects of the concepts and technologies disclosed herein will be described, according to an illustrative embodiment. In some embodiments, the customer devices 116, the customer service devices 126, the UIOP 124, the MLET-DS 102, the AFGS 128, and the WEE 156 can be implemented, at least in part, on the cloud computing platform 800. Those skilled in the art will appreciate that the illustrated cloud computing platform 800 is a simplification of but one possible implementation of an illustrative cloud computing environment, and as such, the cloud computing platform 800 should not be construed as limiting in any way.

The illustrated cloud computing platform 800 includes a hardware resource layer 802, a virtualization/control layer 804, and a virtual resource layer 806 that work together to perform operations as will be described in detail herein. While connections are shown between some of the components illustrated in FIG. 8, it should be understood that some, none, or all of the components illustrated in FIG. 8 can be configured to interact with one other to carry out various functions described herein. In some embodiments, the components are arranged so as to communicate via one or more networks (not shown). Thus, it should be understood that FIG. 8 and the following description are intended to provide a general understanding of a suitable environment in which various aspects of embodiments can be implemented, and should not be construed as being limiting in any way.

The hardware resource layer 802 provides hardware resources, which, in the illustrated embodiment, include one or more compute resources 808, one or more memory resources 810, and one or more other resources 812. The compute resource(s) 808 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812. In some embodiments, the compute resources 808 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, California, and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 808 and/or the memory resource(s) 810 to perform operations described herein, such as with respect to the methods 300, 400. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 802 can be virtualized by one or more virtual machine monitors ("VMMs") 814A-814K (also known as "hypervisors;" hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Turning now to FIG. 9, a machine learning system 900 capable of implementing aspects of the embodiments disclosed herein will be described. In some embodiments, the machine learning system 900 can be or can include the MLET-DS 102. The illustrated machine learning system 900 includes one or more machine learning models 902, such as the machine learning models 108. The machine learning models 902 can include supervised and/or semi-supervised learning models. The machine learning model(s) 902 can be created by the machine learning system 900 based upon one or more machine learning algorithms 904. The machine learning algorithm(s) 904 can be any existing, well-known algorithm, any proprietary algorithms, or any future machine learning algorithm. Some example machine learning algorithms 904 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 904 based upon the problem(s) to be solved by machine learning via the machine learning system 900.

The machine learning system 900 can control the creation of the machine learning models 902 via one or more training parameters. In some embodiments, the training parameters are selected modelers at the direction of an enterprise, for example. Alternatively, in some embodiments, the training parameters are automatically selected based upon data provided in one or more training data sets 906. The training parameters can include, for example, a learning rate, a model size, a number of training passes, data shuffling, regularization, and/or other training parameters known to those skilled in the art. The training data in the training data sets 906 can be collected from DSFC 150 and/or other sources described herein.

The learning rate is a training parameter defined by a constant value. The learning rate affects the speed at which the machine learning algorithm 904 converges to the optimal weights. The machine learning algorithm 904 can update the weights for every data example included in the training data set 906. The size of an update is controlled by the learning rate. A learning rate that is too high might prevent the machine learning algorithm 904 from converging to the optimal weights. A learning rate that is too low might result in the machine learning algorithm 904 requiring multiple training passes to converge to the optimal weights.

The model size is regulated by the number of input features ("features") 908 in the training data set 906. A greater the number of features 908 yields a greater number of possible patterns that can be determined from the training data set 906. The model size should be selected to balance the resources (e.g., compute, memory, storage, etc.) needed for training and the predictive power of the resultant machine learning model 902.

The number of training passes indicates the number of training passes that the machine learning algorithm 904 makes over the training data set 906 during the training process. The number of training passes can be adjusted based, for example, on the size of the training data set 906, with larger training data sets being exposed to fewer training passes in consideration of time and/or resource utilization. The effectiveness of the resultant machine learning model 902 can be increased by multiple training passes.

Data shuffling is a training parameter designed to prevent the machine learning algorithm 904 from reaching false optimal weights due to the order in which data contained in the training data set 906 is processed. For example, data provided in rows and columns might be analyzed first row, second row, third row, etc., and thus an optimal weight might be obtained well before a full range of data has been considered. By data shuffling, the data contained in the training data set 906 can be analyzed more thoroughly and mitigate bias in the resultant machine learning model 902.

Regularization is a training parameter that helps to prevent the machine learning model 902 from memorizing training data from the training data set 906. In other words, the machine learning model 902 fits the training data set 906, but the predictive performance of the machine learning model 902 is not acceptable. Regularization helps the machine learning system 900 avoid this overfitting/memorization problem by adjusting extreme weight values of the features 908. For example, a feature that has a small weight value relative to the weight values of the other features in the training data set 906 can be adjusted to zero.

The machine learning system 900 can determine model accuracy after training by using one or more evaluation data sets 910 containing the same features 908' as the features 908 in the training data set 906. This also prevents the machine learning model 902 from simply memorizing the data contained in the training data set 906. The number of evaluation passes made by the machine learning system 900 can be regulated by a target model accuracy that, when reached, ends the evaluation process and the machine learning model 902 is considered ready for deployment.

After deployment, the machine learning model 902 can perform a prediction operation ("prediction") 914 with an input data set 912 having the same features 908" as the features 908 in the training data set 906 and the features 908' of the evaluation data set 910. The results of the prediction 914 are included in an output data set 916 consisting of predicted data. The machine learning model 902 can perform other operations, such as regression, classification, and others. As such, the example illustrated in FIG. 9 should not be construed as being limiting in any way.

Based on the foregoing, it should be appreciated that aspects of interpretation workflows for machine learning-enabled event tree-based diagnostic and customer problem resolution have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
receiving, by a system comprising a processor, a workflow construction specification derived from a machine learning-enabled event tree, wherein the machine learning-enabled event tree is generated for use by a customer service agent to resolve a customer problem, and wherein the workflow construction specification comprises at least one object representing a navigation path through the machine learning-enabled event tree assisted by machine learning;

creating, by the system, based at least in part on the workflow construction specification and at least one policy, a set of workflow creation commands;

generating, by the system, a workflow visualization interpretation file based upon the set of workflow creation commands, wherein the workflow visualization interpretation file identifies how the machine learning-enabled event tree derived a root cause of the customer problem; and presenting, by the system, the workflow visualization interpretation file to the customer service agent.

2. The method of claim 1, further comprising:
generating, by a machine learning-enabled event tree diagnostic subsystem, a root cause recommendation and a confidence factor associated with the root cause recommendation, wherein the root cause recommendation identifies the root cause of the customer problem derived by the machine learning-enabled event tree;

receiving, by the machine learning-enabled event tree diagnostic subsystem, a request for an interpretation of the root cause recommendation; and generating, by the machine learning-enabled event tree diagnostic subsystem, the workflow construction specification from the machine learning-enabled event tree that identifies the root cause recommendation.

3. The method of claim 2, further comprising:
finding, by the system, the root cause in a workflow model piece repository;

retrieving, by the system, from the workflow model piece repository, a set of workflow model pieces;

generating, by the system, a guided problem resolution workflow; and executing, by the system, the guided problem resolution workflow to guide the customer service agent to resolve the customer problem.

4. The method of claim 3, further comprising:
gathering, by the system, feedback data from executing the guided problem resolution workflow and the workflow visualization interpretation file; and providing, by the system, the feedback data to the machine learning-enabled event tree diagnostic subsystem.

5. The method of claim 1, wherein the customer problem is associated with a service provided by a service provider to a customer.

6. The method of claim 1, wherein the customer problem is associated with a customer device associated with a customer.

7. The method of claim 1, wherein the customer problem is associated with a network utilized by a customer.

8. A computer-readable storage medium comprising computer-executable instructions that, when executed by a processor, cause the processor to perform operations comprising:

receiving a workflow construction specification derived from a machine learning-enabled event tree, wherein the machine learning-enabled event tree is generated for use by a customer service agent to resolve a customer problem, and wherein the workflow construction specification comprises at least one object representing a navigation path through the machine learning-enabled event tree assisted by machine learning;

creating, based at least in part on the workflow construction specification and at least one policy, a set of workflow creation commands;

generating a workflow visualization interpretation file based upon the set of workflow creation commands, wherein the workflow visualization interpretation file identifies how the machine learning-enabled event tree derived a root cause of the customer problem; and presenting the workflow visualization interpretation file to the customer service agent.

9. The computer-readable storage medium of claim 8, wherein the operations further comprise:

generating a root cause recommendation and a confidence factor associated with the root cause recommendation, wherein the root cause recommendation identifies the root cause of the customer problem derived by the machine learning-enabled event tree;

receiving a request for an interpretation of the root cause recommendation; and generating the workflow construction specification from the machine learning-enabled event tree that identifies the root cause recommendation.

10. The computer-readable storage medium of claim 9, wherein the operations further comprise:

finding the root cause in a workflow model piece repository;

retrieving, from the workflow model piece repository, a set of workflow model pieces;

generating a guided problem resolution workflow; and executing the guided problem resolution workflow to guide the customer service agent to resolve the customer problem.

11. The computer-readable storage medium of claim 10, wherein the operations further comprise:

gathering feedback data from executing the guided problem resolution workflow and the workflow visualization interpretation file; and providing the feedback data to a machine learning-enabled event tree diagnostic subsystem.

12. The computer-readable storage medium of claim 8, wherein the customer problem is associated with a service provided by a service provider to a customer.

13. The computer-readable storage medium of claim 8, wherein the customer problem is associated with a customer device associated with a customer.

14. The computer-readable storage medium of claim 8, wherein the customer problem is associated with a network utilized by a customer.

15. A system comprising:

a processor; and a memory comprising computer-executable instructions that, when executed by the processor, cause the processor to perform operations comprising receiving a workflow construction specification derived from a machine learning-enabled event tree, wherein the machine learning-enabled event tree is generated for use by a customer service agent to resolve a customer problem, and wherein the workflow construction specification comprises at least one object representing a navigation path through the machine learning-enabled event tree assisted by machine learning, creating, based at least in part on the workflow construction specification and at least one policy, a set of workflow creation commands, generating a workflow visualization interpretation file based upon the set of workflow creation commands, wherein the workflow visualization interpretation file identifies how the machine learning-enabled event tree derived a root cause of the customer problem, and presenting the workflow visualization interpretation file to the customer service agent.

16. The system of claim 15, wherein the operations further comprise:

generating a root cause recommendation and a confidence factor associated with the root cause recommendation, wherein the root cause recommendation identifies the root cause of the customer problem derived by the machine learning-enabled event tree;

receiving a request for an interpretation of the root cause recommendation; and generating the workflow construction specification from the machine learning-enabled event tree that identifies the root cause recommendation.

17. The system of claim 16, wherein the operations further comprise:

finding the root cause in a workflow model piece repository;

retrieving, from the workflow model piece repository, a set of workflow model pieces;

generating a guided problem resolution workflow; and executing the guided problem resolution workflow to guide the customer service agent to resolve the customer problem.

18. The system of claim 17, wherein the operations further comprise:

gathering feedback data from executing the guided problem resolution workflow and the workflow visualization interpretation file; and providing the feedback data to a machine learning-enabled event tree diagnostic subsystem.

19. The system of claim 15, wherein the customer problem is associated with a service provided by a service provider to a customer.

20. The system of claim 15, wherein the customer problem is associated with a customer device associated with a customer.

* * * * *